United States Patent
Kim et al.

(10) Patent No.: US 10,318,040 B2
(45) Date of Patent: Jun. 11, 2019

(54) TOUCH DISPLAY DEVICE HAVING A GAP BETWEEN ELECTRODES THAT IS VARIABLE

(71) Applicant: LG DISPLAY CO., LTD., Seoul (KR)

(72) Inventors: TaeHoon Kim, Daegu (KR); JeongKil Seo, Gyeongsangbuk-do (KR); Jinsoo Chung, Paju-si (KR); DongHoon Lee, Daegu (KR); JunWook Yoo, Daegu (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 15/709,818

(22) Filed: Sep. 20, 2017

(65) Prior Publication Data
US 2018/0088722 A1    Mar. 29, 2018

(30) Foreign Application Priority Data

Sep. 29, 2016 (KR) .......................... 10-2016-0125600

(51) Int. Cl.
    *G06F 3/041*    (2006.01)
    *G02F 1/1333*   (2006.01)
    *G02F 1/1343*   (2006.01)
    *G06F 3/044*    (2006.01)

(52) U.S. Cl.
    CPC .......... *G06F 3/0414* (2013.01); *G02F 1/1343* (2013.01); *G02F 1/13338* (2013.01); *G06F 3/044* (2013.01); *G06F 3/0416* (2013.01)

(58) Field of Classification Search
    None
    See application file for complete search history.

(56) References Cited

U.S. PATENT DOCUMENTS

| 2011/0175845 | A1  | 7/2011 | Honda et al. |
| 2014/0253305 | A1  | 9/2014 | Rosenberg et al. |
| 2015/0070605 | A1* | 3/2015 | Liu .................. G02B 27/286 349/12 |
| 2015/0268783 | A1* | 9/2015 | Yoon ................ G06F 3/0414 345/173 |

(Continued)

FOREIGN PATENT DOCUMENTS

| KR | 10-1583221 B1 | 1/2016 |
| KR | 10-1659476 B1 | 9/2016 |

(Continued)

OTHER PUBLICATIONS

The Extended European Search Report dated Feb. 8, 2018, for corresponding European Application No. 17 19 2045.7.

*Primary Examiner* — Lunyi Lao
*Assistant Examiner* — Kirk W Hermann
(74) *Attorney, Agent, or Firm* — Morgan, Lewis & Bockius LLP

(57) ABSTRACT

There is provided a touch display device including a display panel including a first electrode for touch sensing, a first support that covers a back surface of an edge area of the display panel, a second support on a back side of the first support and that covers an entirety of the back surface of the display panel, and a touch driver configured to: apply a first electrode driving signal to the first electrode, select one of the first support and the second support as a second electrode, and apply a second electrode driving signal to sense a user's touch pressure applied to the display panel.

15 Claims, 15 Drawing Sheets

(56) References Cited

U.S. PATENT DOCUMENTS

| | | | |
|---|---|---|---|
| 2015/0346891 A1* | 12/2015 | Miller | G06F 3/0416 |
| | | | 345/173 |
| 2016/0098131 A1 | 4/2016 | Ogata et al. | |
| 2016/0370908 A1 | 12/2016 | Kim et al. | |
| 2017/0308218 A1* | 10/2017 | Ding | G06F 3/044 |
| 2018/0180917 A1* | 6/2018 | Li | G02F 1/13338 |

FOREIGN PATENT DOCUMENTS

| | | | |
|---|---|---|---|
| KR | 101659476 B1 * | 9/2016 | |
| WO | 2016/016612 A1 | 2/2016 | |
| WO | WO-2016016612 A1 * | 2/2016 | G01D 5/2417 |

* cited by examiner

TOUCH DISPLAY DEVICE HAVING A GAP BETWEEN ELECTRODES THAT IS VARIABLE

CROSS-REFERENCE TO RELATED APPLICATIONS

This application claims priority from Korean Patent Application No. 10-2016-0125600, filed on Sep. 29, 2016, which is hereby incorporated by reference for all purposes as if fully set forth herein.

BACKGROUND

Technical Field

The present disclosure relates to a touch display device.

Description of the Related Art

With progress of the information-oriented society, various types of demands for display devices for displaying an image are increasing. Various types of display devices, such as a liquid crystal display device, a plasma display device, and an organic light emitting diode display device, have been used.

From among these display devices, implementations on a mobile device such as a smartphone or a tablet PC, and a medium or large device, such as a smart television, may provide a touch input process according to the convenience of a user and device characteristics.

Such display devices capable of performing a touch input process continue to be developed to increase their functionality, and users' demands are also getting more various.

However, a currently-applied touch input process includes sensing only a user's touch position (touch coordinates) and performing an input process relevant to the sensed touch position, and, thus, has limits under circumstances in which it is necessary to provide various kinds of functions in various forms and satisfy the users' demands.

SUMMARY

An aspect of the present disclosure provides a touch display device capable of sensing a touch position by sensing a touch force corresponding to a pressing force on a screen when a user touches the screen.

Another aspect of the present disclosure provides a touch display device in which a touch force corresponding to a pressing force on a screen when a user touches the screen can be uniformly sensed at each position of a display panel.

Yet another aspect of the present disclosure provides a back light unit having a structure which enables a reduction in thickness of touch display device capable of sensing a touch force and also provides a touch display device including the same.

Still another aspect of the present disclosure provides a touch display device of which the entire area can secure uniform touch performance in a force touch method in which a partial area of a cover bottom configured to support a back surface of a display panel is cut.

Still another aspect of the present disclosure provides a cover bottom-cut force touch display device of which the entire area can secure uniform touch performance by selectively applying a ground (GND) signal to a mid-frame configured to support a back surface of a set device and a cut cover bottom depending on a force touch sensing position.

The object is solved by a force touch display device comprising: display panel; a plurality of first electrodes disposed within the display panel, a second electrode for sensing a touch force of the user, wherein a gap is formed between the first electrode and the second electrode, which is variable when a touch force of the user is applied.

Preferably, the display panel comprises a first substrate, the plurality of first electrodes and a second substrate.

According to an aspect of the present invention, there is provided a force touch display device including a cut cover bottom (first support part) configured to support only an edge of a display panel including a first electrode for touch sensing and a mid-frame (second support part) configured to cover the entire back surface of the display panel. In the force touch display device, a touch driver is configured to select one of the cut cover bottom and the mid-frame as a second electrode depending on a force touch sensing position and apply a second electrode driving signal (GND).

Preferably, the gap is formed by a gap structure unit disposed between the plurality of first electrodes and the second electrode.

Preferably, a lower structure is disposed between the display panel and the second electrodes.

Preferably, wherein a part of the cover bottom is removed or cut.

Preferably, the cover bottom being cut, is called hereinafter cut cover bottom, or the mid-frame are used as a second electrode.

More specifically, if the touch driver senses a touch pressure on a central area A1 of the first electrode which is not overlapped with the cut cover bottom, the touch driver selects the mid-frame as the second electrode, and if the touch driver senses a touch pressure on an edge area A2 of the first electrode which is partially overlapped with the cut cover bottom, the touch driver selects the cut cover bottom as the second electrode and then applies the ground signal thereto.

To this end, the touch driver may be included in a data driving circuit D-IC, and the data driving circuit may include a first ground output terminal, a second ground output terminal, and a switching unit configured to switch the output of a ground signal to the first and second ground output terminals.

Also, the force touch display device may further include a flexible printed circuit (FPC) connected to the data driving circuit and including a first ground signal line extended from the first ground output terminal and a second ground signal line extended from the second ground output terminal. The first ground signal line and the second ground signal line of the FPC may be electrically connected to the cut cover bottom and the mid-frame, respectively.

Meanwhile, the touch driver may set the number of first levels for touch pressure sensing on the central area A1 to be greater than the number of second levels for touch pressure sensing on the edge area A2, and drive touch input sensing on the central area and touch input sensing on the edge area in a time-division manner.

Further, the touch driver may sense a first touch input by measuring a self-capacitance generated in the first electrode in response to the first electrode driving signal applied to the first electrode in a first touch operation (in-cell touch mode) period and sense a user's force touch input applied to the display panel by applying the first electrode driving signal to the first electrode and applying the second electrode driving signal to the second electrode selected from the cut cover bottom and the mid-frame in a second touch operation (force touch mode) period.

According to the present exemplary embodiments, the entire area of a display device can secure uniform touch performance in a force touch method in which a partial area of a cover bottom configured to support a back surface of a display panel is cut.

More specifically, the entire area of a cover bottom-cut force touch display device can secure uniform touch performance by selectively applying a ground (GND) signal to a mid-frame configured to support a back surface of a set device and a cut cover bottom depending on a position of applying a touch driving signal.

The object is also solved by a touch display device comprising: a display panel including a first area and a second area; a touch driver configured to sense a touch input on the display panel; wherein a first number of levels for sensing the touch input on the first area of the display panel is different from the second number of levels for sensing the touch input on the second area of the display panel.

Particularly, in case of sensing a force touch on an edge area where a cut cover bottom is present, a ground signal is applied to the cover bottom. Herein, the number of second levels for force touch sensing on the edge area of the display panel is set to be smaller than the number of first levels for force touch sensing on a central area of the display panel. Thus, force touch performance of the entire display device can be improved.

BRIEF DESCRIPTION OF THE DRAWINGS

The accompanying drawings, which are included to provide a further understanding of the disclosure and are incorporated and constitute a part of this application, illustrate embodiments of the disclosure and together with the description serve to explain the various principles. In the drawings.

DETAILED DESCRIPTION

Figure 1:
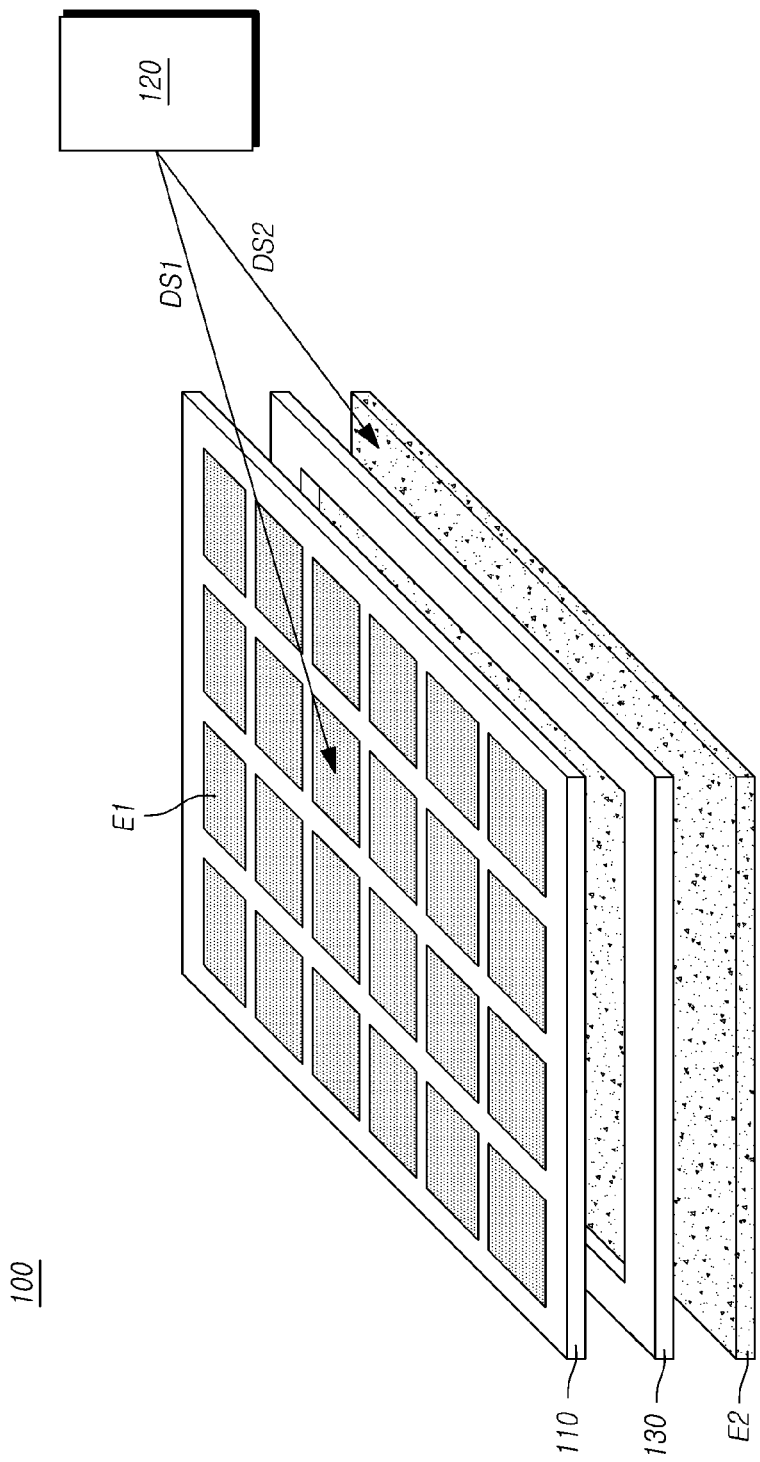
FIG. 1 and FIG. 2 are diagrams schematically illustrating a configuration of an example force touch display device.

Hereinafter, some embodiments of the present disclosure will be described in detail with reference to the accompanying drawings. When reference numerals refer to components of each drawing, although the same components are illustrated in different drawings, the same components are referred to by the same reference numerals as possible. Further, if it is considered that description of related known configuration or function may cloud the gist of the present disclosure, the description thereof will be omitted.

Further, in describing components of the present disclosure, terms such as first, second, A, B, (a), and (b) can be used. These terms are used only to differentiate the components from other components. Therefore, the nature, order, sequence, or number of the corresponding components is not limited by these terms. It is to be understood that when one element is referred to as being "connected to" or "coupled to" another element, it may be directly connected to or directly coupled to another element, connected to or coupled to another element, having still another element "intervening" therebetween, or "connected to" or "coupled to" another element via still another element.

Figure 2:
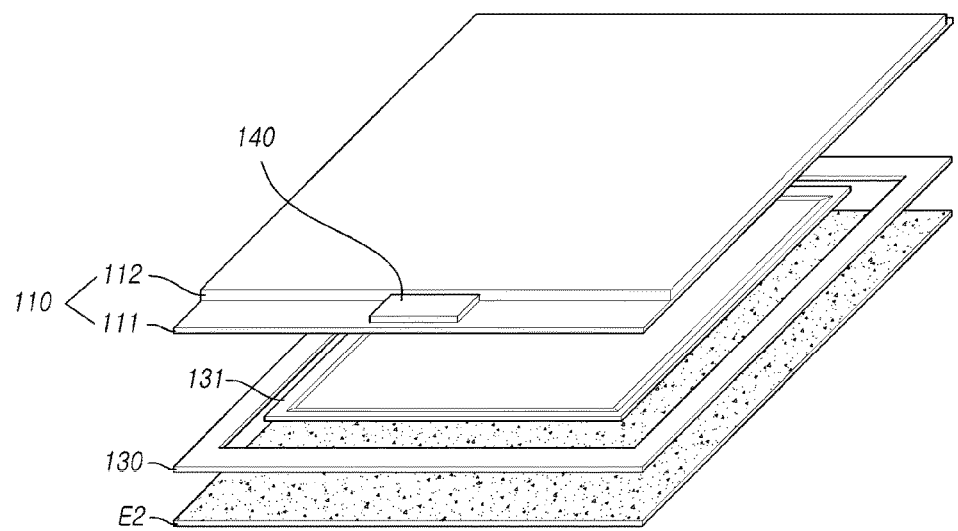

FIG. 1 and FIG. 2 are diagrams schematically illustrating a configuration of an example force touch display device.

With reference to FIG. 1, a force touch display device 100 may include a plurality of first electrodes E1 for sensing a touch or non-touch of a user and a touch position (touch coordinates), a second electrode E2 for sensing a touch force of the user, a display panel 110 in which the plurality of first electrodes E1 is embedded, a driving circuit 120 configured to drive the plurality of first electrodes E1 and the second electrode E2, and a gap structure unit 130 configured to maintain a gap between the plurality of first electrodes E1 and the second electrode E2.

The force touch display device 100 may operate in a display mode for displaying an image, or in a touch mode for sensing a touch (e.g., a touch or non-touch, a touch position, a touch force) of the user.

If the touch display device 100 operates in the display mode, data lines and gate lines disposed in the display panel 110 are driven to display an image.

In this case, the plurality of first electrodes E1 embedded in the display panel 110 is applied with a display driving voltage for image display. That is, the plurality of first electrodes E1 operates as an electrode for display driving in a display mode period.

For example, the first electrodes E1 are used both as common electrodes for applying a common voltage Vcom to a pixel, and touch electrodes for touch recognition.

If the touch display device 100 operates in the touch mode, a touch position (touch coordinates) of the user can be sensed or a touch force of the user can be sensed.

That is, touch sensing may include two kinds of touch sensing modes. A first touch sensing mode is a mode for sensing a touch position by applying a touch driving signal DS to a first electrode and measuring a self-capacitance of the first electrode, which is referred to, for convenience, as an in-cell touch mode or in-cell touch operation.

A second touch sensing mode is a mode for recognizing a touch position by applying a first electrode driving signal DS1 and a second electrode driving signal DS2 to a second electrode, respectively, and measuring a change of a capacitance between both electrodes when a gap between the first electrode and the second electrode is changed due to a touch operation, which is referred to, for convenience, as a force touch mode or force touch operation.

That is, in the in-cell touch mode, the driving circuit 120 senses a touch position (touch coordinates) of the user by sequentially applying the first electrode driving signal DS1 to the plurality of first electrodes E1 and measuring a self-capacitance of the first electrodes during a predetermined in-cell touch driving period.

Further, during a predetermined force touch driving period, the driving circuit 120 senses a touch force of the user by applying the first electrode driving signal DS1 to the plurality of first electrodes E1 and applying the second electrode driving signal to the second electrode E2.

The force touch display device 100 senses a touch force of the user using a change in a gap between the plurality of first electrodes E1 and the second electrode E2 when the user's vertical load on the display panel 110 is generated.

That is, in a state where different driving signals DS1 and DS2 are respectively applied to the first electrode and the second electrode, a capacitance between both electrodes is measured, and if the user makes a touch, a gap between both electrodes is changed at the touch position, which causes a change of the capacitance. The touch position can be determined by sensing the change of the capacitance.

Therefore, a gap may need to be present between the plurality of first electrodes E1 embedded in the display panel 110 and the second electrode E2 positioned outside the display panel 110. In order to maintain the gap, the gap structure unit 130 may be disposed between the plurality of first electrodes E1 and the second electrode E2.

That is, the gap structure unit 130 may enable the gap between the plurality of first electrodes E1 and the second electrode E2 to be changed in size when the user makes a touch, and may make it possible to sense a touch position (touch coordinates) and a touch force of the user by using the change in size of the gap.

Hereinafter, the structure of the example force touch display device 100 to which a present example embodiment can be applied will be described in more detail with reference to FIG. 2.

With reference to FIG. 2, the touch display panel 110 of the touch display device 100 according to present example embodiments may include a first substrate 111 on which a thin film transistor (TFT) and the like are disposed and a second substrate 112 on which a color filter (CF) and the like are disposed.

Further, a driving chip 140 may be mounted on an edge area (non-active area (N/A)) of the first substrate 111 or may be bonded or connected to the non-active area N/A.

Herein, the driving chip 140 may be a chip that implements the driving circuit 120 in whole or in part or may be a data driving chip. Otherwise, the driving chip 140 may be a display driving chip including the driving circuit 120 and a data driving circuit in whole or in part.

The data driving chip may be denoted as D-IC, and within the data driving chip, a data driver configured to control display by applying a data signal to the data lines of the display panel and a touch driver configured to recognize a touch operation by applying a touch driving signal to the touch electrodes may be included.

However, the touch driver is not necessarily included within the data driving chip and may also be provided separately from the data driver.

A lower structure 131 may be positioned under the display panel 110, and the second electrode E2 may be positioned under or inside the lower structure 131.

The lower structure 131 may be, for example, a back light unit of a liquid crystal display device.

In this case, the second electrode E2 may be positioned under the back light unit. Therefore, the second electrode E2 may be disposed without interfering with a light irradiation function of the back light unit.

The gap structure unit 130 may be positioned under, inside, or beside the lower structure 131. Also, the second electrode E2 may be positioned under or inside the gap structure unit 130.

As described above, a touch force sensing structure suitable for a design structure of the display panel 110 and the touch display device 100 can be implemented by variously designing a position of the second electrode E2 or a position of the gap structure unit 130. Details thereof will be described below with reference to FIG. 5 and FIG. 6.

Hereinafter, an example method of sensing a touch position (touch coordinates) and a touch force of the user by the example force touch display device 100 will be described with reference to FIG. 3 and FIG. 4. For convenience of explanation, the touch display device 100 according to a present example embodiments will be described as a liquid crystal display device.

Figure 3:
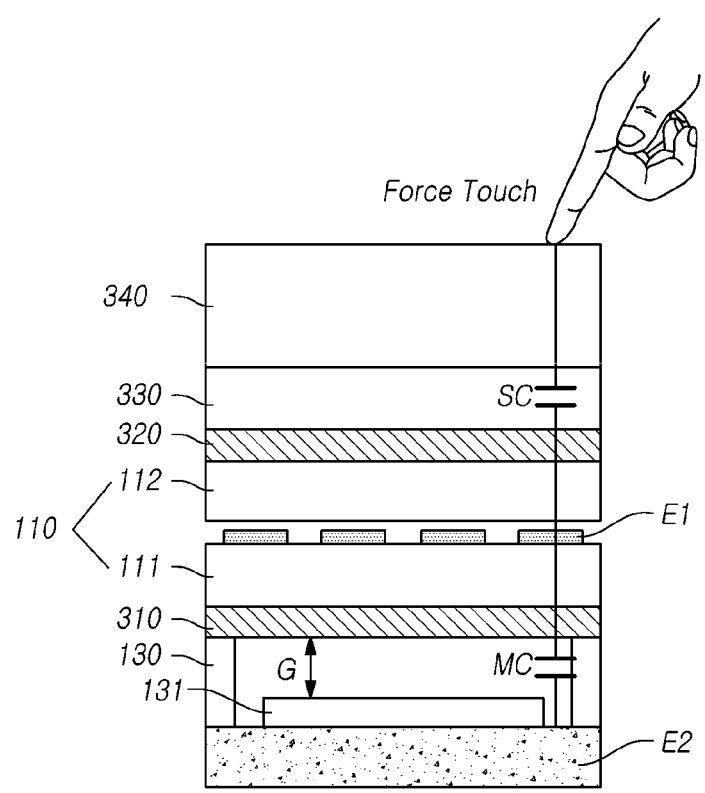
FIG. 3 is a diagram illustrating a cross-section of the example force touch display device.
Figure 4:
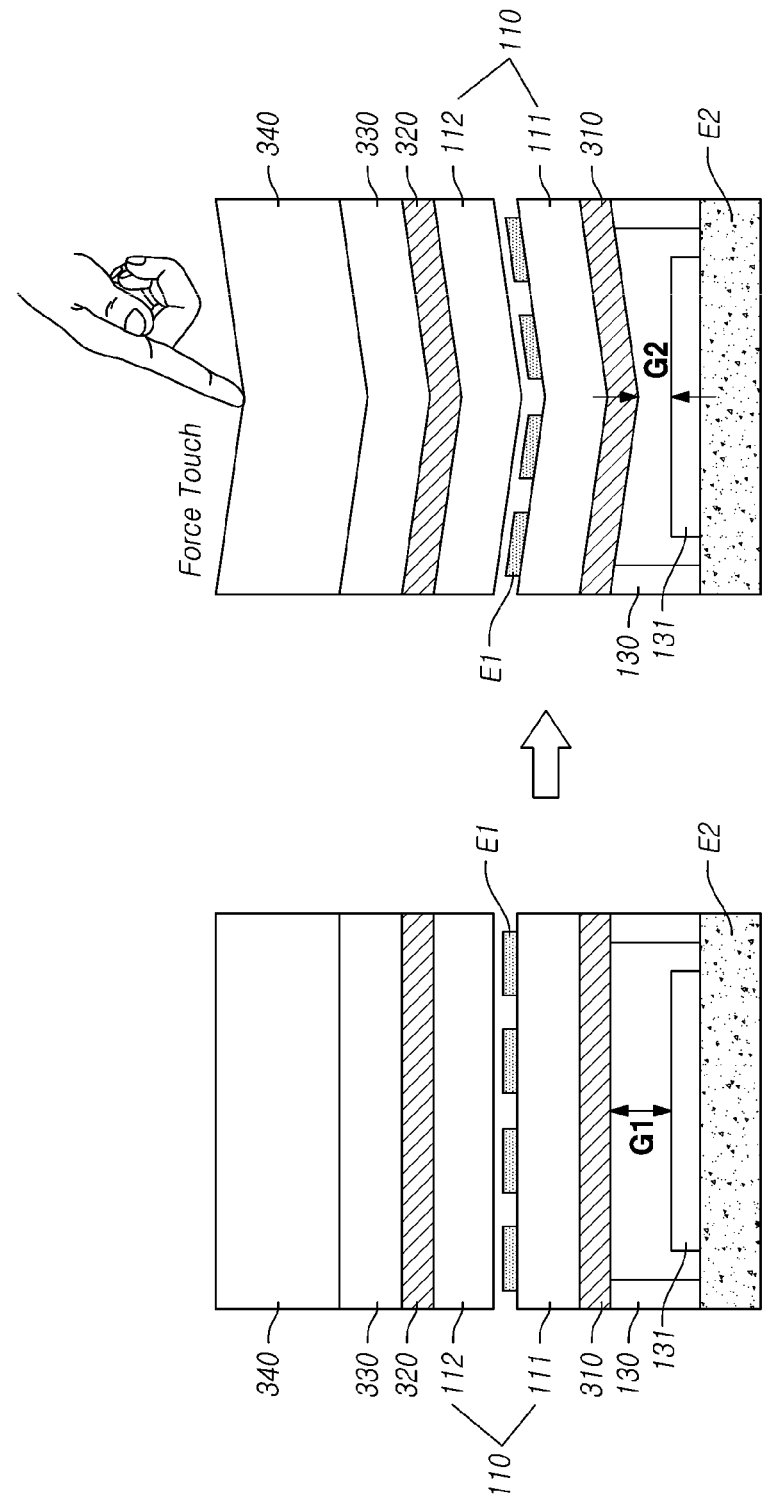
FIG. 4 is a diagram illustrating the situation where a gap is changed in the example force touch display device and a principle of sensing a force touch accordingly.

FIG. 3 is a diagram illustrating a cross-section of the example force touch display device 100, and FIG. 4 illustrates the situation where a gap between the first electrode E1 and the second electrode E2 is changed by the user's touch on the force touch display device 100.

With reference to FIG. 3, the example display panel 110 of the touch display device 100 includes a first polarizing plate 310, the first substrate 111, the plurality of first electrodes E1, the second substrate 112, and a second polarizing plate 320.

Further, a bonding layer 330 and an upper cover 340 are positioned on the display panel 110.

The touch display device 100 applies the first electrode driving signal DS1 to the plurality of first electrodes E1 in an in-cell touch operation period in which only the first electrodes are used during a touch mode.

Further, when the user makes a touch, a change in size of a self-capacitance SC between a conductive pointer such as the user's finger and the plurality of first electrodes E1 is sensed to sense a touch position (touch coordinates) of the user.

The touch display device 100 applies the first electrode driving signal DS1 to the plurality of first electrodes E1 and the second electrode driving signal DS2 to the second electrodes E2 in a force touch operation period for sensing a touch force of the user during the touch mode.

In this case, the second electrode driving signal DS2 applied to the second electrode E2 may be a signal of a ground voltage.

Further, when a vertical load is generated due to the touch of the user, a change of a mutual capacitance MC caused by a change of a gap G between the plurality of first electrodes E1 and the second electrodes E2 is sensed to sense a touch force of the user.

That is, during an in-cell touch operation, a touch position (touch coordinates) is sensed by sensing a change of the self-capacitance SC generated in the first electrodes when the user makes a touch, and during a separate force touch operation, a touch force is sensed by sensing a change of the mutual capacitance MC between the first electrodes and the second electrode.

In order to perform the force touch operation, the gap G may need to be formed between the plurality of first electrodes E1 and the second electrodes E2 so as to cause a change of the mutual capacitance MC between the first electrodes and the second electrode.

With reference to FIG. 4, if a vertical load is generated due to the user's touch, the upper cover 340, the display panel 110, and the like, are slightly bent downwards.

Therefore, a size of the gap G, such as an air gap or dielectric gap, present between the plurality of first electrodes E1 and the second electrode E2 may be changed.

According to the example illustrated in FIG. 4, if the gap G before the generation of the vertical load caused by the user's touch is denoted by G1 and the gap G after the generation of the vertical load caused by the user's touch is denoted by G2, G2 is smaller than G1 due to the vertical load.

As such, the gap G between the plurality of first electrodes E1 and the second electrode E2 is decreased from G1 to G2 due to the generation of the vertical load caused by the user's touch, which results in a change of the mutual capacitance MC, and, thus, a touch force of the user can be sensed.

Meanwhile, the second electrode E2 for sensing a touch force of the user may be a component added to the touch display device 100 for touch force sensing, or a component already included in the touch display device 100 may be used as the second electrode E2.

For example, a back cover of the back light unit included in the liquid crystal display device may be used as the second electrode E2 to sense a touch force of the user.

Figure 5:
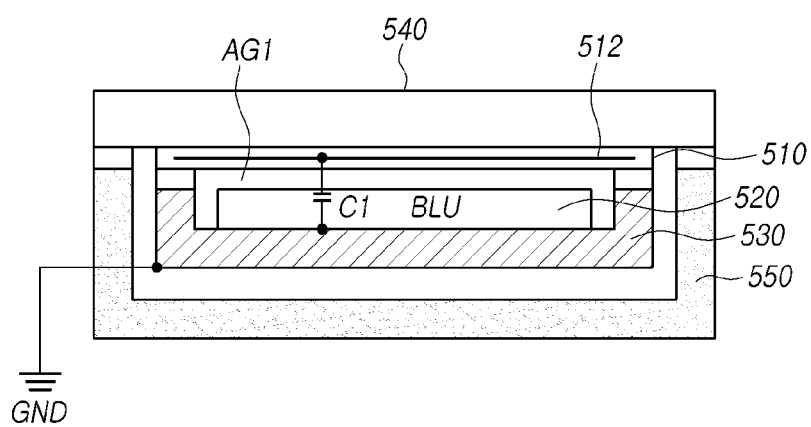
FIG. 5 and FIG. 6 illustrate various configuration methods of a first electrode and a second electrode for force touch sensing in the example force touch display device.
Figure 6:
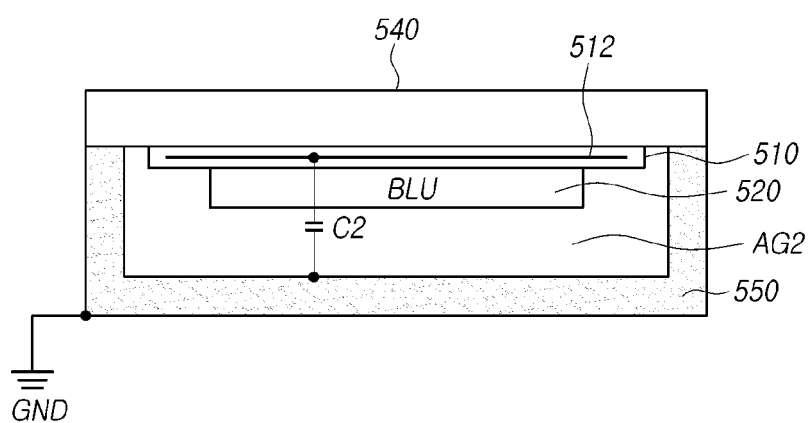

FIG. 5 and FIG. 6 illustrate various configuration methods of a first electrode and a second electrode for force touch sensing in the force touch display device.

Herein, the term "display device" may be used to refer to a display device such as a liquid crystal module (LCM) including a display panel and a driver for driving the display panel as well as a concept including even a set electronic device or a set device such as a notebook computer, a television, a computer monitor, and a mobile electronic device, such as a smartphone or an electronic pad, which may be complete products including the LCM.

For convenience, a display device including a display panel, a driver controlling a touch and image display on the display panel, and a support structure supporting the driver may herein be referred to as "display module," and a set electronic device as a complete product including the display module may be referred to as "set device" or "display device."

That is, in FIG. 5 and FIG. 6, a liquid crystal display panel 510, a back light unit 520 for providing back light thereto, and a cover bottom 530 as a support structure configured to a back surface of the back light unit may be referred to as "liquid crystal display module," and a complete product further including a cover glass 540 configured to protect a front surface of the liquid crystal display panel and a mid-frame 550 configured to support the back of the liquid crystal display module and thus serving as a support structure for the entire set device may be referred to as "set device" or "display device."

In the force touch display device illustrated in FIG. 5, the cover bottom 530 of the liquid crystal display module LCM is used as a second electrode for force touch.

That is, within the liquid crystal display panel 510, a first electrode 512 used as a common electrode and touch electrode is disposed. The first electrode is used as a touch electrode during an in-cell touch operation and also used as a touch electrode corresponding to a second electrode during a force touch operation.

Also, in FIG. 5, the cover bottom 530 of the liquid crystal display module is used as a second electrode for force touch, and a ground signal which is the second electrode driving signal DS2 may be input into the cover bottom.

That is, in the force touch structure as illustrated in FIG. 5, a force touch is sensed in a state where the first electrode 512 disposed within the liquid crystal display panel is applied with the first electrode driving signal DS1 and the cover bottom 530 used as the second electrode is applied with the ground signal GND as the second electrode driving signal.

To this end, a gap as a space for force touch sensing needs to be formed between the first electrode 512 and the cover bottom 530 serving as the second electrode. A space between the liquid crystal display panel 510 including the first electrode and the cover bottom 530 may be used as the gap.

For example, for force touch sensing, the gap needs to be variable due to a pressing force of the user. Therefore, the back light unit disposed as a fixed body between the first electrode and the second electrode may not be used as a gap structure. Accordingly, a first air gap AG1, which is a variable gap, needs to be formed between a back surface of the liquid crystal display panel 510 and the back light unit 520.

Therefore, in the force touch display device as illustrated in FIG. 5, the first electrode and the second electrode, e.g., the cover bottom, within the display panel are used and a change of a first capacitance C1 between both electrodes caused by a change of the first air gap AG1, which is a variable gap between the back surface of the liquid crystal display panel 510 and the back light unit 520, is measured to sense a force touch.

Meanwhile, the force touch display device as illustrated in FIG. 5 may further include the cover glass 540 configured to protect the front surface of the liquid crystal display panel and the mid-frame 550 configured to support the back of the liquid crystal display module and thus serving as a support structure for the entire set device besides the above-described liquid crystal display module. However, the mid-frame 550 may not be relevant to force touch sensing.

FIG. 6 is a cross-sectional view of another type of an example force touch display device and illustrates an example where a separate cover bottom is not used.

In a structure as illustrated in FIG. 6, a cover bottom as a support structure for a back surface of a liquid crystal display module may not be used, and a mid-frame as a back structure for a set device may be disposed directly on a back surface of a back light unit.

In the force touch display device illustrated in FIG. 6, the mid-frame 550 functions as a second electrode, and a second air gap AG2 is formed between the back light unit 520 and the mid-frame 550. A size of the second air gap AG2 is changed during a touch operation of the user. Thus, a force touch can be recognized.

That is, if there is a touch pressure of the user in a state where a first electrode driving signal is applied to the first electrode 512 disposed within the liquid crystal display panel 510 and a ground signal as a second electrode driving signal is applied to the mid-frame 550 serving as the second electrode, a second capacitance C2 between the first electrode and the second electrode is changed depending on a change in size of the second air gap AG2. A position of a force touch can be recognized by measuring the change of the second capacitance C2.

However, the force touch display devices configured as illustrated in FIG. 5 and FIG. 6 may have the following disadvantages.

In the structure in which the cover bottom of the display module is used as a second electrode as illustrated in FIG. 5, the cover bottom may be bent or warped in use. Such solution is more stable, since two structures are used.

Also, the first air gap AG1 may be requisitely formed between the liquid crystal display panel 510 and the back light unit 520, which might increase in overall thickness of the display device. However, the capacity can not be changed easily due to the cover bottom 530 and the mid frame 550.

Meanwhile, the structure in which the mid-frame 550 of the set device is used as a second electrode as illustrated in FIG. 6 may not be applied to a display device without a cover bottom.

That is, typically, a display module may be manufactured separately and then delivered to a complete product manufacturer, and, thus, a display module manufacturer may need to manufacture and supply a display module without a cover bottom in order to apply the force touch display device as illustrated in FIG. 6.

However, the manufactured display module without a cover bottom may be likely to be damaged during delivery and thus has not been widely used. Therefore, the force touch display device as illustrated in FIG. 6 may not be widely applied.

To overcome this problem, an example cover bottom-cut force touch display device, in which a part of a cover bottom is removed as illustrated in FIG. 7, may be provided.

Figure 7A:
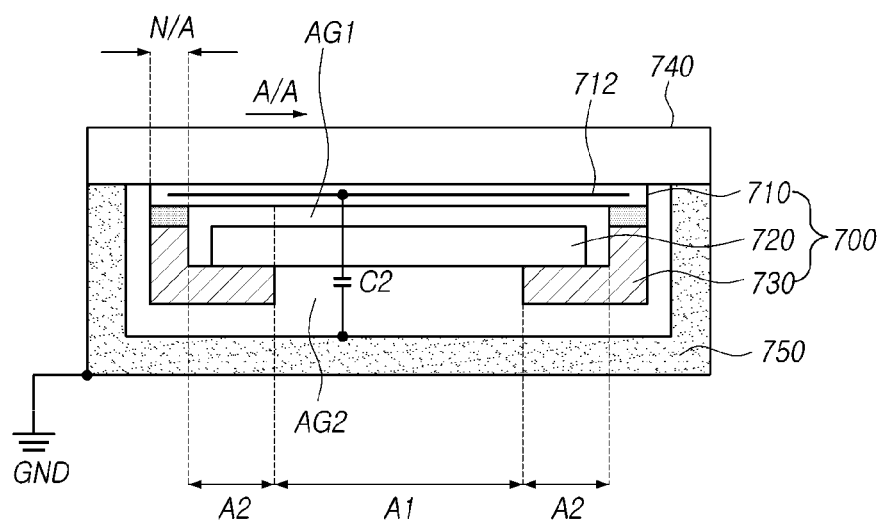
FIGS. 7A and 7B illustrates a cross-sectional structure of an example cover bottom-cut force touch display device to which a present example embodiment can be applied.
Figure 7B:
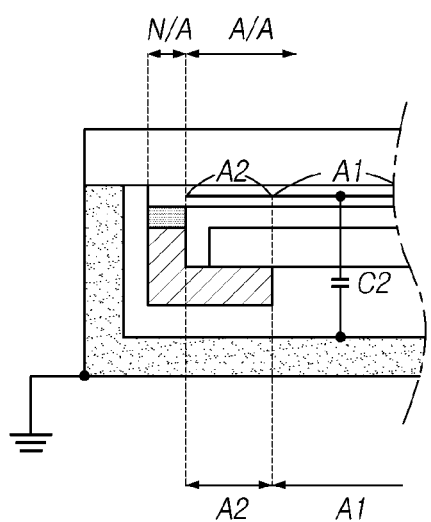
Figure 8:
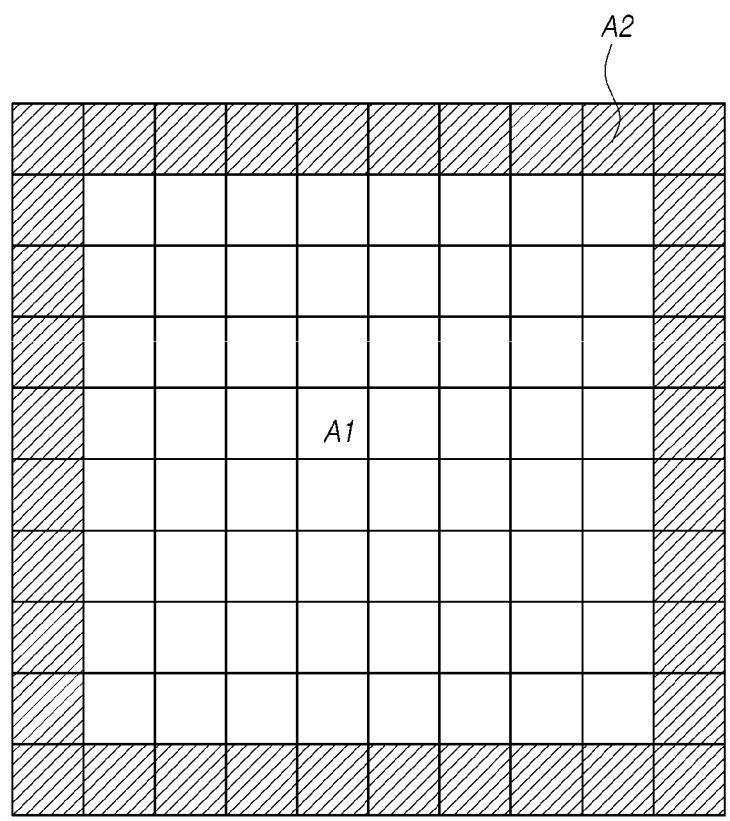
FIG. 8 is a plan view illustrating the layout of a first electrode of the example force touch display device according to a present example embodiment in which the first electrode includes a central area which is not overlapped with a cover bottom and an edge area which is overlapped with the cover bottom.

FIGS. 7A and 7B illustrate a cross-sectional structure of an example cover bottom-cut force touch display device to which a present example embodiment can be applied. FIG. 8 is a plan view illustrating the layout of a first electrode of the force touch display device according to the present example embodiment.

As illustrated in FIG. 7A, the cover bottom-cut force touch display device may have the advantages of the structures illustrated in FIG. 5 and FIG. 6. In the cover bottom-cut force touch display device, a display module includes a cover bottom of which a central area is removed and which is present only on an edge area of the display module, and a mid-frame of a set device is used as a second electrode.

That is, as illustrated in FIG. 7A, the example force touch display apparatus includes a display module 700 including a display panel 710 having a first electrode 712 therein, a back light unit 720 configured to supply light to the display panel, and a cut cover bottom 730 of which a central area is removed and which supports only an edge area of the back light unit, a cover glass 740 disposed on a front side of the display panel, and a mid-frame 750 connected to the cover glass and configured as a back structure for the entire display device (set device).

The cut cover bottom 730 is a bottom portion which has central portion which has been removed. Thus, a central portion of the cut cover bottom 730 is open.

In this case, the mid-frame 750 serves as a second electrode and a ground signal is applied thereto.

Also, in the removed central area of the cover bottom, a second air gap AG2 as a space between a back surface of the back light unit and the mid-frame is defined.

During a force touch operation period, the first electrode 712 is applied with a first electrode driving signal and the mid-frame 750 as the second electrode is applied with a ground signal as a second electrode driving signal.

If there is a touch pressure of the user in that state, a size of the second air gap AG2 is changed at that position. Therefore, a second capacitance C2 between the first electrode and the second electrode is changed. By measuring the amount of change of the second capacitance C2, a force touch position can be sensed.

The force touch display device as illustrated in FIG. 7A may overcome the disadvantages of the structures as illustrated in FIG. 5 and FIG. 6. However, in the force touch display device, as illustrated in FIG. 7A, the cover bottom is overlapped with a part of an active area A/A of the display panel, and the overlapped area may have different force touch performance than a central area A1 where the cover bottom is removed.

Meanwhile, the first electrode of the force touch display device according to a present example embodiment includes the central area A1 where the first electrode is not overlapped with the cover bottom, and an edge area A2 where the first electrode is overlapped with the cover bottom, as illustrated in FIG. 8.

That is, as the first electrode, a total of M*N number of touch electrodes are disposed, and touch electrodes on a line disposed on an edge of the entire touch area are disposed to be partially overlapped with a part of the cut cover bottom disposed thereunder. In this case, the cut cover bottom may be only partially overlapped with touch electrodes (e.g., the outermost touch electrode block) on a line disposed on the outermost edge, or may be entirely overlapped with the touch electrodes (e.g., the outermost touch electrode block) on the line disposed on the outermost edge.

In this structure, as illustrated in an enlarged view of FIG. 7B, a force touch may be sensed on the central area A1 where the cover bottom is removed. However, a part of the edge area A1 where the cut cover bottom remains is overlapped with a part of the active area A/A of the display device, and in this overlapped area, the cover bottom formed of metal may be present between the mid-frame 750 as the second electrode and the first electrode, and, thus, a desired force touch performance may not be secured.

That is, in the edge area A2, a distance of the air gap between the first electrode and the second electrode (mid-frame) is changed and the cut cover bottom formed of metal is disposed between the both electrodes and functions as a shielding layer. Thus, a change of the capacitance between the both electrodes may not be accurately measured.

Accordingly, in the structure as illustrated in FIGS. 7A and 7B, a force touch may not be sensed on the area where the cut cover bottom is overlapped with the active area A/A.

Therefore, the example force touch display device according to a present example embodiment has the structure as illustrated in FIG. 7. For example, a data driver or a touch driver may use one selected from the mid-frame 750 and the cut cover bottom 730 as the second electrode in order to sense a force touch on the central area A1 and the edge area A2 of the first electrode.

Figure 9:
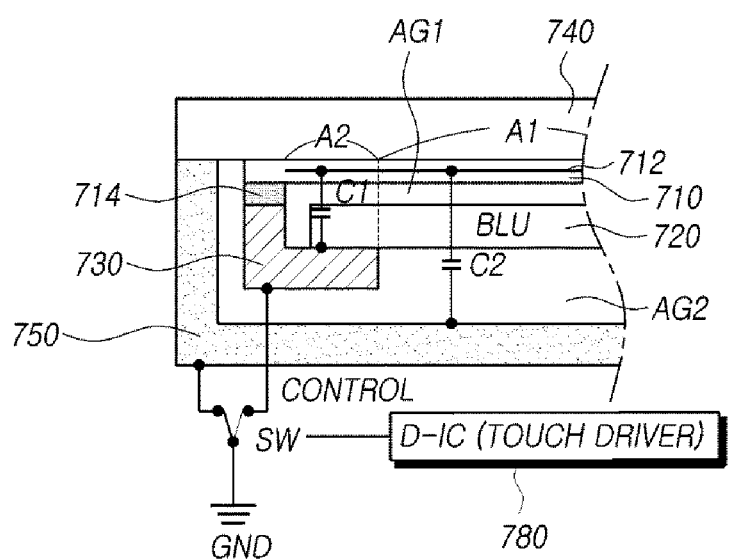
FIG. 9 illustrates the example force touch display device according to a present example embodiment in which a touch control unit switches a second electrode when the touch control unit senses a force touch on the central area and the edge area.

FIG. 9 illustrates the example force touch display device according to a present example embodiment in which a touch control unit switches a second electrode when the touch control unit senses a force touch on the central area and the edge area.

As illustrated in FIG. 9, the example force touch display device according to a present example embodiment includes the display panel 710 including the first electrode 712 for touch sensing, the cut cover bottom disposed to cover a back surface of the edge area of the display panel and serving as a first support part, the mid-frame 750 disposed on a back side of the cut cover bottom and serving as a second support part covering the entire back surface of the display panel, and a touch driver 780 configured to sense a touch input into the display panel.

A touch driver 780 may be implemented as being included in a data driving circuit D-IC configured to control image output of the display panel. Therefore, herein, for convenience, the touch driver is illustrated as a data driving circuit, but is not limited thereto.

Meanwhile, the touch driver 780 according to a present example embodiment performs a force touch operation for recognizing the user's touch pressure applied to the display panel as a force touch. This force touch operation functions to sense the user's touch pressure applied to the display panel by applying a first electrode driving signal to the first electrode, selecting one of the cut cover bottom 730 and the mid-frame 750 as the second electrode, and then applying a second electrode driving signal to the selected second electrode.

That is, according to a present example embodiment, the cut cover bottom 730 as illustrated in FIG. 7A is configured as the first support part for the display module and the mid-frame 750 on its back side is configured as the second support part for the entire display device (set device), and in case of a force touch, one of the cut cover bottom and the mid-frame is selected as the second electrode. That is, according to the present example embodiment, the cut cover bottom 730 can be used as the second electrode for force touch besides the mid-frame 750.

In this case, the second electrode driving signal may be a ground signal, and the touch driver may determine a position of a force touch by applying the ground signal as the second electrode driving signal to the selected second electrode and then measuring a change of a capacitance between the first electrode and the second electrode.

For example, if a touch pressure is sensed on the central area A1 of the first electrode which is not overlapped with the cut cover bottom, the touch driver selects the mid-frame 750 as the second electrode. If a touch pressure is sensed on the edge area A2 of the first electrode which is partially overlapped with the cut cover bottom, the touch driver selects the cut cover bottom 730 as the second electrode.

In this case, the touch driver may drive touch input sensing on the central area A1 and touch input sensing on the edge area A2 in a time-division manner.

As illustrated in FIG. 9, in order to sense a force touch on the edge area A2 of the first electrode which is partially overlapped with the cut cover bottom, the touch driver 780 according to a present example embodiment applies the ground signal (second electrode driving signal) to the cut cover bottom 730 and then measures a change of a first capacitance C1 formed between the first electrode 712 applied with the first electrode driving signal and the second electrode and thus senses a force touch.

Also, in order to sense a force touch on the central area A1 of the first electrode which is not overlapped with the cut cover bottom, the touch driver 780 applies the ground signal (second electrode driving signal) to the mid-frame 750 as a back support structure for the set device and then measures a change of a second capacitance C2 formed between the first electrode 712 applied with the first electrode driving signal and the second electrode and thus senses a force touch.

Thus, unlike the illustration in FIG. 7A, a force touch can be sensed on the edge area A2 where the cut cover bottom is overlapped with the active area. Therefore, force touch performance on the outermost touch electrode block can be improved in both a case where the cut cover bottom is only partially overlapped with touch electrodes (e.g., outermost touch electrode block) on a line disposed on the outermost edge, and a case where the cut cover bottom is entirely overlapped with the touch electrodes (e.g., outermost touch electrode block) on the line disposed on the outermost edge.

Meanwhile, the other one of the two which is not selected as the second electrode from among the cut cover bottom and the mid-frame may need to be continuously floated and maintained in a high-impedance state (e.g., "Hi-Z"). This is because if the cover bottom or the mid-frame which is not selected as the second electrode is maintained at a constant potential, a constant and unnecessary capacitance may be generated between the non-selected one and the first electrode, and the unnecessary capacitance may be added to the second capacitance C2 measured from the first electrode during a normal force touch operation, and thus may cause a decrease in measurement precision.

For example, if the cover bottom which is not selected as the second electrode is not floated during a force touch sensing operation on the central area A1, force touch performance on the central area A1 occupying most of the display panel may be degraded.

Also, during a force touch sensing operation on the edge area A2, a size of the first air gap AG1 for measurement of the first capacitance C1 is smaller than that of the second air gap AG2 in the central area. Thus, a magnitude of the first capacitance C1 for force touch sensing may be relatively low. Therefore, in this case, if the mid-frame which is not selected as the second electrode is not floated and an unnecessary capacitance is generated between the first electrode and the mid-frame and then added to the first capacitance, force touch performance may be further degraded on the edge area A2 than on the central area A1.

Therefore, the other one of the two which is not selected as the second electrode from among the cut cover bottom and the mid-frame may need to be continuously floated and maintained in the high-impedance state Hi-Z.

According to a present example embodiment, the force touch display device may further include the back light unit 720 disposed between the display panel 710 and the cut cover bottom 730 and configured to supply light to the display panel.

For example, in order to sense a force touch on the edge area A2, the first air gap AG1 may need to be formed between the back light unit 720 and the display panel 710.

To this end, as illustrated in FIG. 9, an adhesive member 714 having a uniform thickness may be disposed between an edge of the display panel 710 and the cutting cover bottom 730 so as to bond the both members and form the first air gap AG1 between the back light unit and the display.

Therefore, if a touch operation is performed on the edge area A2, a distance of the first air gap is changed, and, thus, by sensing a change of the first capacitance C1, a touch input position can be determined.

Meanwhile, in the central area A1 where the cover bottom is removed, the second air gap AG2 is formed between the back light unit 720 and the mid-frame 750 besides the above-described first air gap.

Therefore, while a force touch is sensed on the central area A1, distances of the first air gap AG1 and the second air gap AG2 are changed depending on the user's touch pressure, and, thus, by measuring the amount of change of the second capacitance C2, a force touch position can be determined.

In this case, a variable space between both electrodes in the central area A1 may be the sum of the first air gap and the second air gap, and a variable space between both electrodes in the edge area A2 may be the first air gap.

Therefore, even if the same touch pressure is applied, the amount of change of the second capacitance C2 in the central area A1 is greater than the amount of change of the first capacitance C1 in the edge area A2.

Accordingly, in a present example embodiment, the number of first levels for touch pressure sensing on the central area A1 is set to be greater than the number of second levels for touch pressure sensing on the edge area A2.

For example, a first force touch sensing signal (data) indicating a change of the second capacitance for force touch sensing on the central area A1 has 8 bits and may have a total of 256 first levels, and a second force touch sensing data on the edge area A2 has 2 bits and may have a total of 4 second levels.

The data formats or numbers of levels of the force touch sensing signals will be described below in more detail with reference to FIG. 13.

As a result, a force touch sensitivity or resolution on the central area A1 is set to be higher than a force touch sensitivity or resolution on the edge area A2, and, thus, a force touch can be sensed precisely on the central area and can also be sensed on the edge area which is overlapped with the cover bottom. Therefore, a force touch sensing area may be extended.

Meanwhile, the touch driver 780 may drive force touch input sensing on the central area A1 and touch input sensing on the edge area A2 in a time-division manner. Thus, a force touch operation can be readily performed on the entire display panel.

As described herein, the cut cover bottom 730 is not limited to the term itself, and may be embodied by other expressions such as a plate bottom, a base frame, a metal frame, a metal chassis, a chassis base, and an m-chassis. Further, the cut cover bottom 730 may be interpreted to include all types of frames or plate-shaped structures supporting a back side of an edge of at least one of the display panel and the back light unit.

However, unlike a typical cover bottom, the cut cover bottom 730 used in a present example embodiment may not be disposed in the central area of the display device but supports only the edge of the display device.

Also, the mid-frame 750 is not limited to the term itself, and may be interpreted to include all types of support structures supporting a hindmost side of the set device as a complete product including the display panel. Further, the mid-frame 750 may be substituted by other terms such as a back cover and a set cover.

Furthermore, if the display panel 710 used in a present example embodiment is a liquid crystal display panel, the display panel 710 may include a plurality of gate lines and data lines, pixels defined on intersections therebetween, an array substrate including a thin film transistor which is a switching element for adjusting light transmittance in each pixel, an upper substrate including a color filter and/or a black matrix, and a liquid crystal material layer formed therebetween.

Present example embodiments are not necessary limited to a liquid crystal display device, but can be applied to all types of display systems including a first electrode for touch sensing therein and capable of sensing a force touch caused by a change of a gap between the first electrode and a second electrode separate from the first electrode.

The first electrode 712 according to a present example embodiment functions as a common electrode configured to supply a common voltage to pixels included in the display panel. The first electrode 712 make take the form of a single first electrode that may be disposed so as to cover a plurality of pixels.

Figure 10A:
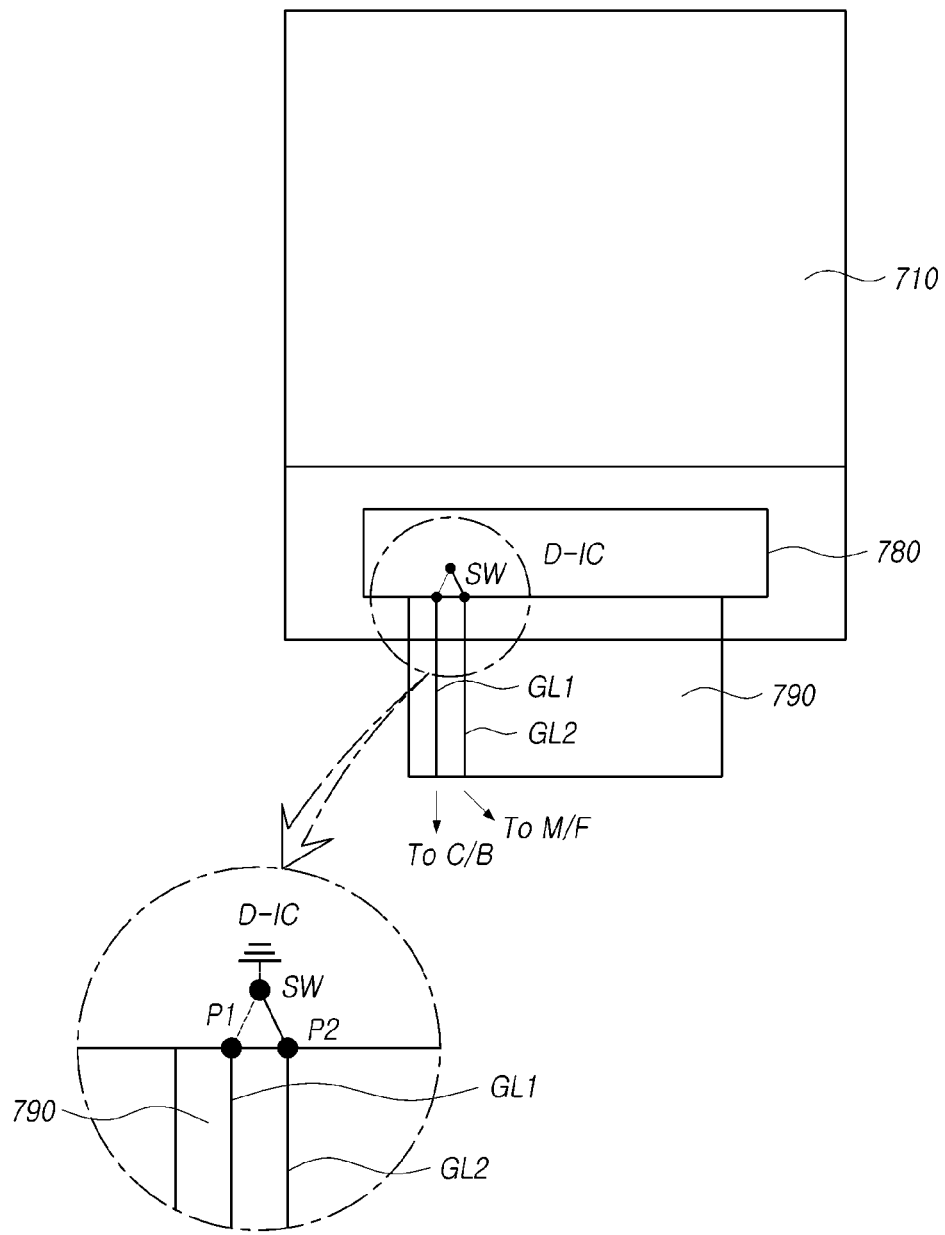
FIGS. 10A and 10B illustrates an example internal configuration of the touch control unit (or data driver) for switching the second electrode and a structure for supplying a ground signal to the cover bottom and the mid-frame in the example force touch display device according to a present example embodiment.
Figure 10B:
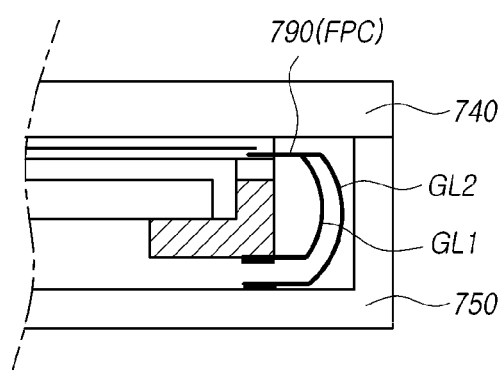

FIGS. 10A and 10B illustrate an internal configuration of the touch control unit (or data driver) for switching the second electrode and a structure for supplying a ground signal to the cover bottom and the mid-frame in the force touch display device according to a present example embodiment.

As illustrated in FIG. 10A, the touch driver 780 according to a present example embodiment may be included in a data driving circuit D-IC, and the data driving circuit D-IC may include a first ground output terminal P1, a second ground output terminal P2, and a switching unit SW configured to switch the output of a ground signal between the first and second ground output terminals.

Also, as illustrated in FIG. 10A and FIG. 10B, the data driving circuit D-IC may further include a flexible printed circuit (FPC) 790 connected to the data driving circuit D-IC so as to connect an external set PCB and the data driving circuit.

The FPC 790 may include a first ground signal line GL1 extended from the first ground output terminal of the data driving circuit D-IC and a second ground signal line GL2 extended from the second ground output terminal. The first ground signal line GL1 may be electrically connected to the cut cover bottom 730 and the second ground signal line GL2 may be electrically connected to the mid-frame 750.

That is, a custom pin within the data driving circuit D-IC includes the first ground output terminal P1 and the second ground output terminal P2, and the two ground signal lines GL1 and GL2 are further disposed in the FPC in addition to other ground signal lines and then connected to the cut cover bottom 730 and the mid frame 750, respectively.

The touch driver uses the switching unit SW to control the output of a ground signal to the first ground output terminal P1 and the second ground output terminal P2 in a time-division manner during a force touch sensing operation on the central area A1 and the edge area A2.

In this example, a part of the first ground signal line GL1 formed in the FPC 790 may be opened and then attached to the cut cover bottom 730 using a conductive tape or the like so as to be electrically connected thereto.

Also, a connector or the like at an end of the second ground signal line GL2 formed in the FPC 790 may be attached to the mid-frame 750. Thus, the second ground signal line may be electrically connected to the mid-frame.

With the configuration described above, it may be possible to easily switch the ground signal (second electrode driving signal) for force touch sensing on the central area and the edge area with a minimum change in structure of the data driving circuit and flexible printed circuit.

Figure 11:
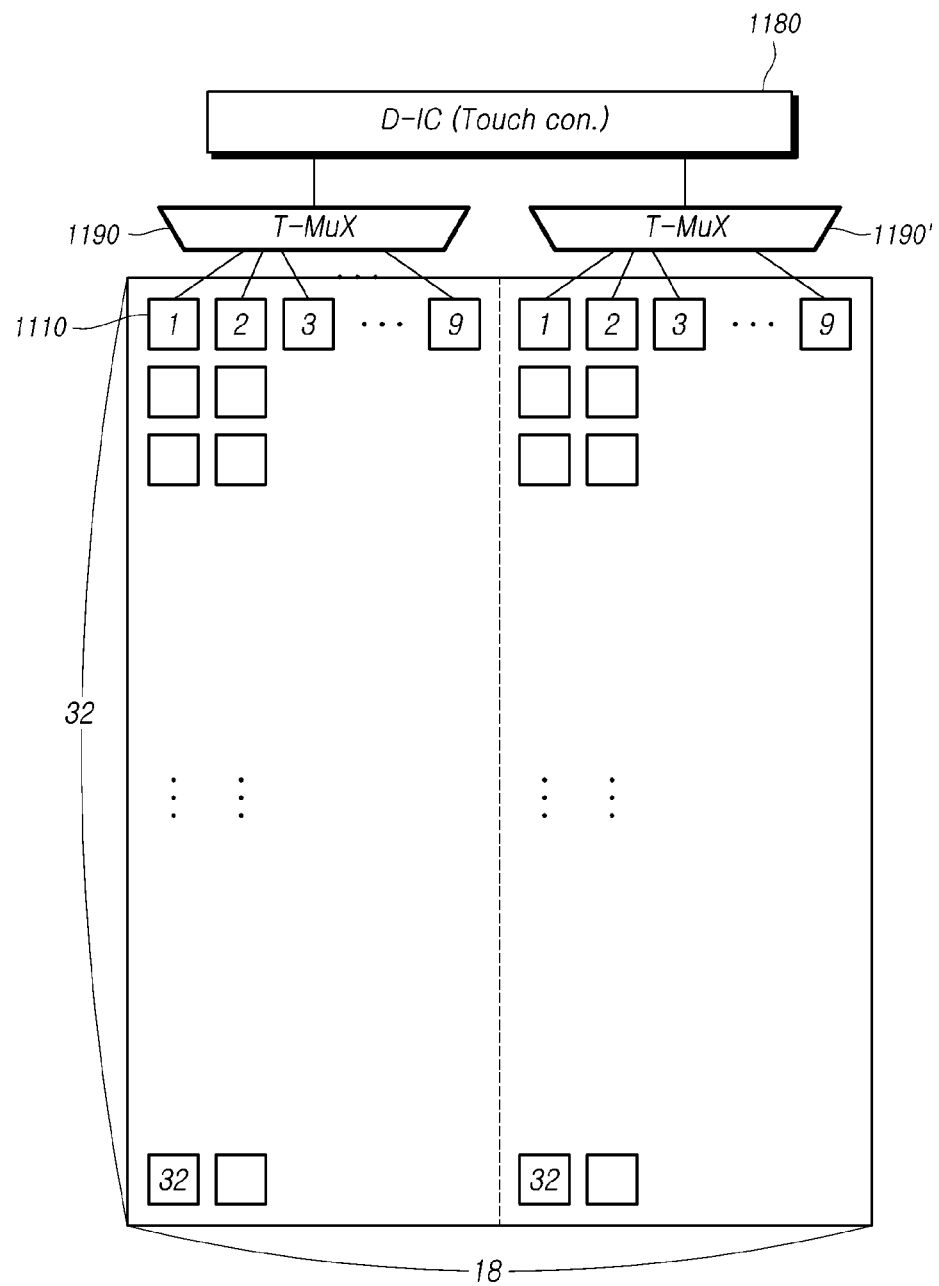
FIG. 11 illustrates an example of the layout of the first electrodes of the example force touch display device according to a present example embodiment and illustrates a structure in which two touch electrode groups are symmetrically disposed and each of the touch electrode groups includes k (k=9) number of touch electrode blocks.

FIG. 11 illustrates an example of the layout of the first electrodes of the force touch display device according to a present example embodiment and illustrates a structure in which two touch electrode groups are symmetrically disposed and each of the touch electrode groups includes k (k=9) number of touch electrode blocks.

In the force touch display device as illustrated in FIG. 11, the first electrodes as touch electrodes included in a display panel include a plurality of touch electrode block groups disposed in the display panel, and each of the touch electrode block groups may include a plurality of touch electrode blocks 1110.

For example, as illustrated in FIG. 11, the first electrode has a structure in which a first touch electrode block group including k number of first touch electrode blocks disposed on the left (first side) of the display panel and a second touch electrode block group including k number of second touch electrode blocks on the right (second side) of the display panel are symmetrically disposed, and each of the first touch electrode block and the second touch electrode block may include a column of m number of touch electrodes.

That is, as illustrated in FIG. 11, on the left of the display panel, a total of 9 first touch electrode blocks are disposed and on the right, a total of 9 second touch electrode blocks are disposed, and each touch block includes a total of 32 touch electrodes disposed in a longitudinal direction.

As a result, a total of 18*32 first electrodes (touch electrodes) are disposed on the display panel. Each touch electrode and touch electrode block is may not necessarily be identical to each other in size and number. For example, a touch electrode block disposed on an edge of the display panel may include a smaller number of blocks or touch electrodes than the other touch electrode blocks, and, thus, it may be possible to maintain a uniform touch sensitivity.

Furthermore, the force touch display device includes touch multiplexers (T-MUX) 1190 and 1190' configured to switch the application of a touch driving signal to a plurality of touch electrodes included in each of the first touch electrode blocks and the second touch electrode blocks. The T-MUX includes a first T-MUX 1190 in charge of the first touch electrode blocks on the left and a second T-MUX 1190' in charge of the second touch electrode blocks on the right.

As will be described below, the first T-MUX 1190 sequentially supplies a first electrode driving signal to a total of 9 first touch electrode blocks to perform touch sensing, and the second T-MUX 1190' sequentially supplies the first electrode driving signal to a total of 9 second touch electrode blocks to perform touch sensing.

Meanwhile, the first T-MUX 1190 and the second T-MUX 1190' may perform their operations in a symmetrical manner.

That is, while the first T-MUX applies the first electrode driving signal to an ith first touch electrode block, the second T-MUX also applies the first electrode driving signal to an ith second touch electrode block.

Meanwhile, the touch display device according to a present example embodiment may perform both a first touch operation of sensing a touch input using only the first electrodes and a second touch operation of sensing a touch input using the first electrodes and the second electrode.

For convenience, the first touch operation using only the first electrodes within the display panel may be expressed as "in-cell touch" and the second touch operation using all the first electrodes and the second electrode may be expressed as "force touch," but are not limited to these expressions.

That is, a touch driver may apply the first electrode driving signal only to the first electrodes and measure a self-capacitance generated in the first electrodes to sense a touch input during an in-cell touch operation period.

Furthermore, during a force touch operation period, the touch driver may apply the first electrode driving signal to the first electrodes and apply a second electrode driving signal to the second electrode which is one of a cut cover bottom or a mid-frame, and then measure a mutual capacitance between the first electrodes and the second electrode to sense a touch pressure.

The in-cell touch mode (first touch operation) and the force touch mode (second touch operation) may be driven in a time-division manner.

Figure 12:
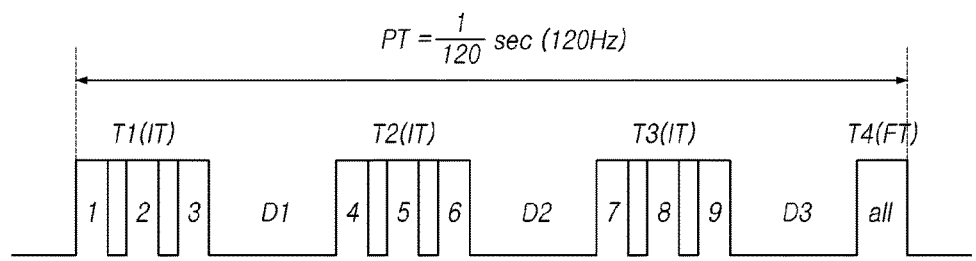
FIG. 12 illustrates an example of a time-division driving method of an in-cell touch mode, a display mode, and a force touch mode in the example force touch display device according to a present example embodiment.

FIG. 12 illustrates an example of a time-division driving method of an in-cell touch mode, a display mode, and a force touch mode in the force touch display device according to a present example embodiment.

As illustrated in FIG. 12, in the display device according to a present example embodiment, a display operation mode for displaying an image on pixels and a touch operation mode are repeatedly performed in a time-division manner.

For example, as illustrated in FIG. 12, in a first touch operation period T1, an in-cell touch mode is performed to first to third touch electrode blocks from among the touch electrode blocks illustrated in FIG. 11 and then a first display operation mode D1 is performed thereto.

Then, in a second touch operation period T2, in-cell touch sensing is performed to fourth to sixth touch electrode blocks and then a second display operation mode D2 is performed thereto. Then, in a third touch operation period T3, in-cell touch sensing is performed to seventh to ninth touch electrode blocks.

For example, in the layout of touch electrodes as illustrated in FIG. 11, an operation including sequentially applying the first electrode driving signal only to first to third first touch electrode blocks and first to third second touch electrode blocks under the control of the T-MUX during the first touch operation period T1 and sequentially applying the first electrode driving signal only to fourth to sixth first touch electrode blocks and fourth to sixth second touch electrode blocks under the control of the T-MUX during the second touch operation period T2 is repeated to perform in-cell touch sensing.

Then, in a fourth touch operation period T4, force touch sensing is performed. That is, during the fourth touch operation period T4, the first electrode driving signal is sequentially applied to all of the first electrodes. At the same time, the ground signal is applied to the second electrode. Then, a capacitance between both electrodes is measured to sense a force touch.

As a result, a touch position is identified via in-cell touch sensing, and then the touch position is confirmed via force touch sensing.

As such, touch sensing is performed twice on a single display panel, and thus, touch recognition can be further improved.

In this example, an in-cell touch sensing operation and a force touch sensing operation may take about $\frac{1}{120}$ sec to complete. As a result, a touch sensing frequency may be 120 Hz, but is not limited thereto.

Figure 13:
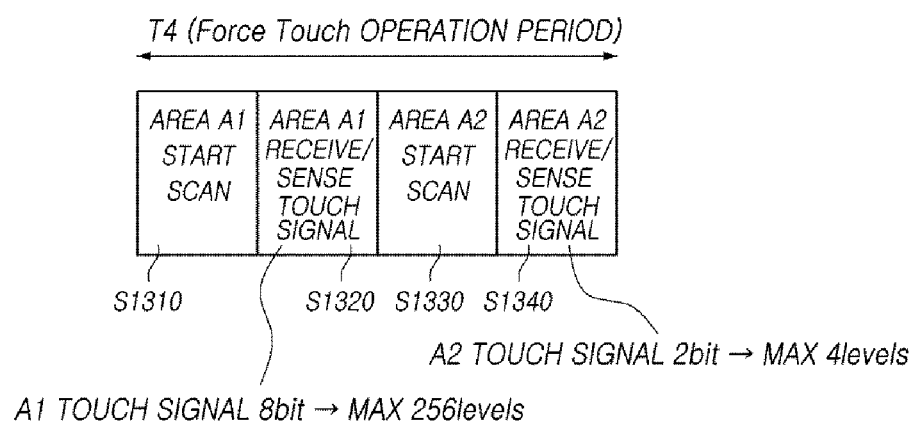
FIG. 13 illustrates a force touch operation via a shift of the second electrode according to a present example embodiment, and illustrates an example of data formats or numbers of levels of a touch sensing signal on a central area A1 and a touch sensing signal on an edge area A2.

FIG. 13 illustrates an example force touch operation via a shift of the second electrode according to a present example embodiment, and illustrates an example of data formats or numbers of levels of a touch sensing signal on the central area A1 and a touch sensing signal on the edge area A2. FIG. 13 illustrates a detailed flow of force touch sensing during the fourth touch operation period T4 in the time-division touch sensing illustrated in FIG. 12.

First, a scan start signal for the central area A1 which is not overlapped with the cover bottom is applied (S1310), and then the second capacitance C2 between the first electrode disposed in the central area A1 and the mid-frame (second electrode) is received as a touch signal and a touch position is sensed (S1320).

According to a detailed flow of S1320, the first electrode driving signal is applied to the first electrodes in the entire area including the central area A1 and the edge area A2, and the second electrode driving signal GND is applied to the mid-frame selected as the second electrode, and then a capacitance between both electrodes is measured. In this case, the touch driver ignores a capacitance value measured from the edge area A2 but obtains only a capacitance value measured from the central area A1.

Then, when a scan start signal for the edge area A2 which is overlapped with the cover bottom is applied (S1330), the first capacitance C1 between the first electrodes disposed on the edge area A2 and the cut cover bottom (second electrode) is received as a touch signal and a touch position is sensed (S1340).

According to a detailed flow of S1340, the first electrode driving signal is applied to the first electrodes in the entire area including the central area A1 and the edge area A2, and the second electrode driving signal GND is applied to the cut cover bottom selected as the second electrode, and then a capacitance between the both electrodes is measured. In this case, there is no second electrode corresponding to the first electrode in the central area A1 as illustrated in FIG. 9, and thus, a capacitance cannot be measured from the central area. Therefore, only a capacitance value measured from the edge area A2 is obtained.

Meanwhile, as described above with reference to FIG. 9, the amount of change of the second capacitance C2 measured from the central area A1 is greater than the amount of change of the first capacitance C1 measured from the edge area A2.

That is, the edge area A2 may have a relatively small first air gap AG1 and the central area A1 may have a large second air gap AG2, and thus, if the same touch pressure is applied, a change of the gap and a resultant change of the capacitance may be greater in the central area.

As a result, a force touch sensitivity may be lower in the edge area A2 than in the central area A1.

Therefore, in order to reflect different force touch sensitivities in the central area and the edge area, and as discussed above, the number of first levels for touch sensing on the central area A1 may be set to be greater than the number of second levels for touch sensing on the edge area.

For example, as illustrated in FIG. 13, a force touch signal measured from the central area A1 is data with 8 bits and may have a total of 256 first levels, and a force touch signal measured from the edge area A2 is data with 2 bits and may have a total of 4 second levels.

As such, by applying different sensitivities or numbers of levels to force touch sensing signals measured from the central area A1 and the edge area A2, it may be possible to extend a force touch sensing area in the edge area and also possible to perform force touch sensing more precisely in the central area than in the edge area.

As described above, if a touch display device according to a present example embodiment is used, the entire area of the display device can secure uniform touch performance in a force touch method in which a partial area of a cover bottom configured to support a back surface of a display panel is cut.

For example, in a cover bottom-cut force touch display device, the entire area of the display device may secure uniform touch performance by selectively applying a ground (GND) signal to a mid-frame configured to support a back surface of a set device and a cut cover bottom depending on a force touch sensing area.

Also, in case of sensing a force touch on an edge area where a cut cover bottom is present, a ground signal may be applied to the cover bottom. Herein, the number of second levels for force touch sensing on the edge area of the display panel may be set to be smaller than the number of first levels for force touch sensing on a central area of the display panel. Thus, force touch performance of the entire display device may be improved.

It will be apparent to those skilled in the art that various modifications and variations may be made in the present disclosure without departing from the technical idea or scope of the disclosure. Thus, it is intended that embodiments of the present disclosure cover the modifications and variations of the disclosure provided they come within the scope of the appended claims and their equivalents.

What is claimed is:

1. A force touch display device, comprising:
   a display panel;
   a plurality of first electrodes disposed within the display panel;
   a cover bottom below the first electrodes for supporting a back light unit;
   a mid-frame surrounding the cover bottom;
   a second electrode for sensing a touch force of a user;
   wherein a gap is formed between the plurality of first electrodes and the second electrode, which is variable when the touch force of the user is applied;
   wherein the cover bottom or the mid-frame is used as the second electrode, and a part of the cover bottom is removed or cut;
   wherein the mid-frame and the cut cover bottom are selectively used as the second electrode.

2. The force touch display device as claimed in claim 1, wherein the display device is operated in a display mode, in a first touch mode, and in a second touch mode.

3. The force touch display device as claimed in claim 2, wherein in the first touch mode, a first electrode driving signal is applied to the plurality of first electrodes, and/or wherein in the second touch mode, the first electrode driving signal is applied to the plurality of first electrodes and a second electrode driving signal is applied to the second electrode.

4. The force touch display device as claimed in claim wherein the first touch mode is to sense a touch on a central area of the display panel and the second touch mode is to sense a touch on an edge area of the display panel.

5. The force touch display device as claimed in claim 1, further comprising a liquid crystal display panel, the back light unit, and the cut cover bottom forming a support structure for the back light unit forming a liquid crystal display module (LCM), and a cover glass configured to protect a front surface of the liquid crystal display panel and a mid-frame configured to support a back of the liquid crystal display module (LCM).

6. The force touch display device as claimed in claim 5, wherein the gap between the plurality of first electrodes and the second electrode includes a first gap which is a variable gap and formed between a back surface of the liquid crystal display panel and the back light unit.

7. The force touch display device as claimed in claim 6, wherein an adhesive member is disposed between an edge of the display panel and the cover bottom to form the first gap between the back light unit and the display panel.

8. The force touch display device as claimed in claim 1, wherein the cut cover bottom is overlapped with a part of an active area A/A of the display panel in an edge area.

9. The force touch display device as claimed in claim 8, wherein a touch driver is adapted to select the mid-frame as the second electrode for sensing a touch on a central area of the plurality of first electrodes not overlapped with the cut cover bottom, or the touch driver is adapted to select the cut cover bottom as the second electrode for sensing a touch on an edge area of the plurality of first electrodes partially overlapped with the cut cover bottom.

10. The force touch display device as claimed in claim 9, wherein the touch driver is adapted to drive touch input sensing on the central area and on the edge area in a time-division manner.

11. The force touch display device as claimed in claim 9, wherein the one of the mid-frame and the cut cover bottom that is not selected as the second electrode is floated and maintained in a high-impedance state.

12. The force touch display device as claimed in claim 1, wherein a level for sensing touch on a central area of the display panel is different from a level for sensing force touch on an edge area of the display panel.

13. The force touch display device as claimed in claim 1, wherein a touch driver is included in a data driving circuit, and the data driving circuit includes a first ground output terminal, a second ground output terminal, and a switching unit configured to switch an output of a ground signal to the first or second ground output terminals.

14. The force touch display device as claimed in claim 13, further comprising: a flexible printed circuit (FPC) connected to the data driving circuit and including a first ground signal line extended from the first ground output terminal and a second ground signal line extended from a second ground output terminal, wherein the first ground signal line is electrically connected to the cut cover bottom and the second ground signal line is electrically connected to the mid-frame.

15. The force touch display device as claimed in claim 1, further comprising:
the back light unit configured to supply light to the display panel,
wherein a first gap is disposed between the back light unit and the display panel,
wherein when a touch driver senses a touch input on an edge area of the display panel, the touch driver is adapted to measure a change of a capacitance caused by a change of the first gap and to sense the touch input.

* * * * *